United States Patent [19]

Koziol

[11] 4,434,781
[45] Mar. 6, 1984

[54] THERMALLY EFFICIENT BARBECUE GRILL

[76] Inventor: Walter Koziol, 18845 State Line Rd., Antioch, Ill. 60002

[21] Appl. No.: 345,703

[22] Filed: Feb. 4, 1982

[51] Int. Cl.³ .............................................. A47J 37/00
[52] U.S. Cl. .................................. 126/25 R; 126/290; 236/1 G; 236/93 R
[58] Field of Search ............... 126/25 R, 25 B, 29, 126/9 R, 15 R, 77, 163 R, 285 R, 289, 290, 193; 236/15 A, 1 G, 93 R

[56] References Cited

U.S. PATENT DOCUMENTS

| | | | |
|---|---|---|---|
| 2,797,874 | 7/1957 | Harding | 236/96 |
| 3,228,605 | 1/1966 | Diermayer et al. | 236/93 |
| 3,266,478 | 8/1966 | Booth | 126/25 |
| 3,286,620 | 11/1966 | Brown | 99/446 |
| 3,306,280 | 2/1967 | Vannoy | 126/25 |
| 3,380,444 | 4/1968 | Stalker | 126/25 |
| 3,433,211 | 3/1969 | Latta | 126/25 |
| 3,500,812 | 3/1970 | Korngold | 126/25 R |
| 3,510,059 | 5/1970 | Diermayer et al. | 236/93 |
| 3,561,348 | 2/1971 | Weir | 99/259 |
| 3,951,335 | 4/1976 | Kemp | 236/15 A |
| 4,114,805 | 9/1978 | Humphreys | 236/1 G |
| 4,146,048 | 3/1979 | McCabe | 137/75 |
| 4,180,051 | 12/1979 | Maier et al. | 126/77 |
| 4,191,326 | 3/1980 | Diermayer | 236/1 G |
| 4,201,125 | 5/1980 | Ellis | 99/446 |
| 4,203,427 | 5/1980 | Way | 126/451 |

OTHER PUBLICATIONS

Texas Instruments Thermostat Metals Designer's Guide.
Installation Instructions, Ameri-therm Thermally Actuated Vent Damper.
Ameri-Therm Limited Warranty card.

*Primary Examiner*—Daniel J. O'Connor
*Attorney, Agent, or Firm*—Neil E. Hamilton

[57] ABSTRACT

A barbecue grill unit which includes thermally actuated dampers and insulated walls to conserve heat during its operation. The dampers are of the laminated bimetallic type which progressively open in direct proportion to the heat generated by burner. This limits the amount of air entering the grill which must be heated yet affords efficient combustion. A vent in the back wall of the cover also maximizes heat usage before the heated air is expelled from the grill unit. Preferably, the barbecue grill unit is of the gas-burning type.

15 Claims, 16 Drawing Figures

THERMALLY EFFICIENT BARBECUE GRILL

BACKGROUND OF THE INVENTION

This invention relates to barbecue grills which can operate with maximum fuel efficiency. More particularly, this invention relates to an automatic damper control for a barbecue grill which can efficiently control the amount of air entering the grill for combustion purposes as well as an insulated housing for the grill to be used in conjunction therewith.

In U.S. Pat. No. 3,025,848 a manually operated damper is illustrated for a barbecue grill. In U.S. Pat. Nos. 2,797,874; 3,228,605; 3,510,059; 4,114,805; 4,146,048 and 4,191,326 thermally actuated dampers are described for use in conjunction with furnaces with bimetallic devices being employed.

An insulated barbecue grill is described in U.S. Pat. No. 3,306,280 as well as U.S. Pat. Nos. 3,266,478; 3,433,211 and 3,380,444. U.S. Pat. Nos. 3,286,620; 3,561,348; 4,201,125 and 4,203,427. All illustrate insulative materials in combination with various types of cooking units.

None of the prior art patents provide a thermally actuated vent for a barbecue grill which will provide only the required amount of outside air for combustion purposes as well as one which is insulated with the automatic air control. The prior art is either concerned with automatic flue dampers for furnaces or with insulated grills by themselves.

It is an advantage of the present invention to provide a barbecue grill unit which can operate with maximum fuel efficiency. Other advantages are a barbecue grill with an automatic damper control; an insulated housing for the grill unit with the automatic damper control; and a grill unit which is safe to use in preventing burns to the operator by affording a cool exterior surface during operation due to a colored porcelain insulated inner liner while permitting easy cleanability; and substantially reduces gas outage when the burner is set at a low rate.

SUMMARY OF THE INVENTION

The foregoing advantages are accomplished and the shortcomings of the prior art are overcome by the present thermally actuated vent damper apparatus for a barbecue grill which includes a base member constructed to receive the usual heating means with a grill member positioned above the heating means. A vent means is provided in a cover member which encloses the top of the base member. At least one vent opening or means is provided in the base member and a thermally actuated vent means is positioned in conjunction with the vent means in the cover member or the opening in the base member. The thermally actuated vent means is constructed to proportionately permit more air to enter the base member through the vent means as the temperature in the base member increases and to proportionately limit the amount of air through the vent opening when the temperature decreases. In a preferred manner the thermally actuated vent means is of a laminated bimetallic plate type or a thermally expanding coil spring. Also in a preferred manner, both the cover and base members have insulated walls and the vent means in the cover is disposed in the cover adjacent the top of the base member and the rear wall thereof.

BRIEF DESCRIPTION OF DRAWINGS

A better understanding of the present fuel efficient barbecue grill will be accomplished by reference to the drawings wherein.

DESCRIPTION OF THE EMBODIMENTS

Figure 1:
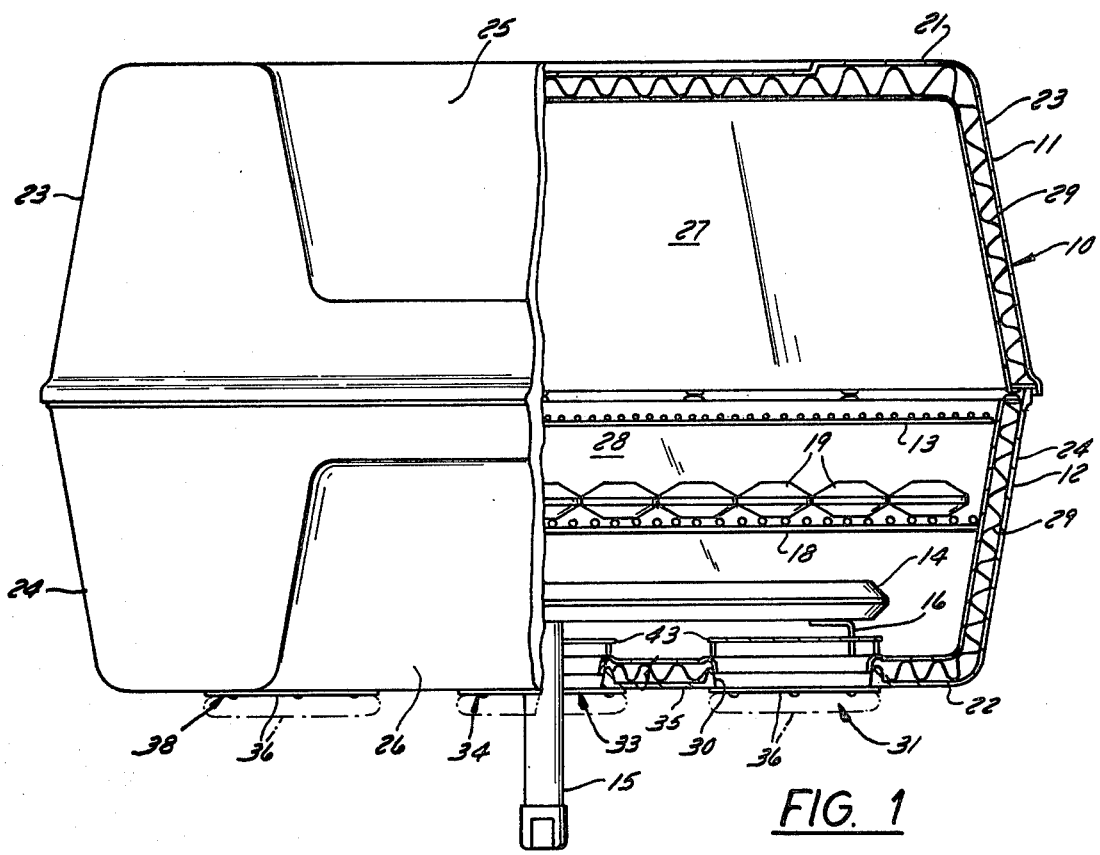
FIG. 1 is a view in side elevation and with a portion broken away of the insulated barbecue grill unit with the thermally actuated vent dampers.

Proceeding to a detailed description of the present invention, a grill unit is generally described at 10 in FIG. 1 having an insulated cover 11 and insulated base 12. The usual gas burner is illustrated at 14 connected to a gas intake venturi tube 15. Burner 14 is supported above base bottom wall 22 by means of feet 16. The usual grate 18 supports ceramic briquettes 19 above burner 14 and below grill member 13.

Figure 2:
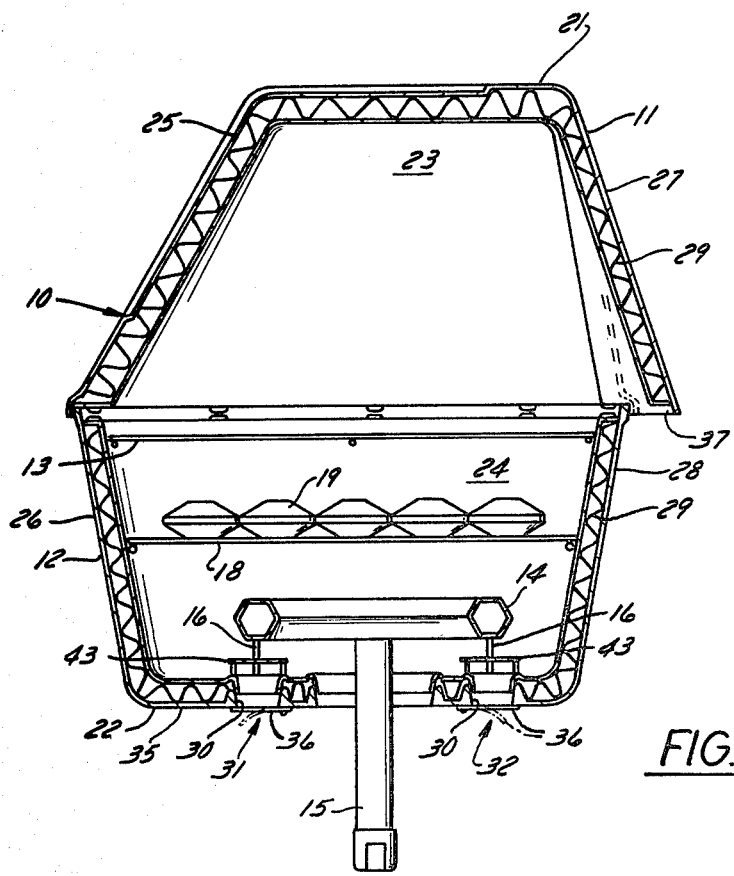
FIG. 2 is a view in vertical section of the barbecue grill unit shown in FIG. 1.

As seen in FIGS. 1 and 2, the cover 11 is formed from top wall 21, two side walls such as 23 and front and back walls 25 and 27, respectively. All of the walls contain insulation 29 such as Range Spin-Glas available from Johns-Manville. The same is true of base member 12 wherein insulation 29 is placed in front wall 26, back wall 28, two side walls such as 24 and bottom wall 22.

Figure 14:
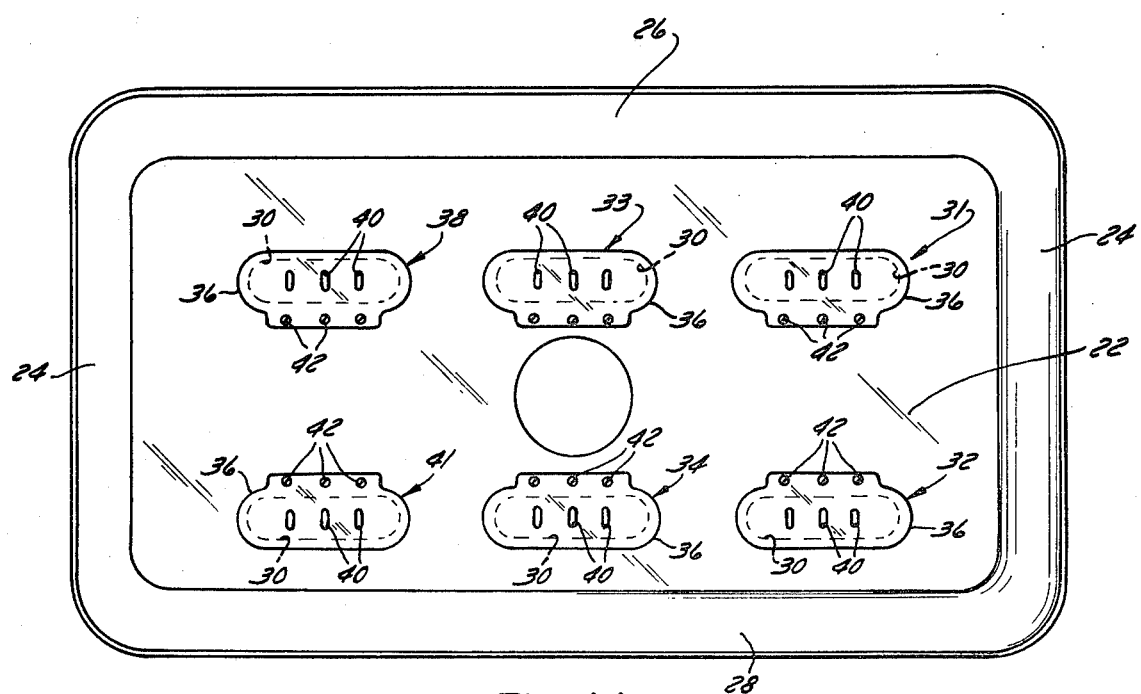
FIG. 14 is a bottom view of the grill unit shown in FIG. 1.

Extending through bottom wall 22 are six vent openings such as 30 which are covered by a vent plate 36 when the grill 10 is in a cold condition. Vent openings 30 and vent plates 36 will comprise six thermal vent dampers as best seen in FIG. 14 by numerals generally 31-34, 38 and 41. As best seen in FIGS. 2-6, a bimetallic vent plate 36 extends across vent openings 30 and is secured at one side to the bottom wall 22 by means of holes 39 and screws 42. Slots 42 are provided in the plates 36 to afford a minimum amount of ventilation at all times. An optional baffle 43 can be provided over the inside of vent opening 30, and spaced therefrom, to prevent grease or other undesired matter from contacting bimetallic plates 36.

FIGS. 7–10 illustrate a further embodiment generally 50 with two oppositely positioned vent plates 46 and 56 extending substantially across vent opening 30. They are, as is true of vent plate 36, secured to bottom wall 22 by screws 42 in openings 39. As specifically seen in FIG. 7, vent plates 46 and 56 do not extend completely across opening 30 to provide the same partial ventilation as afforded by slots 40 in plate 36.

Figure 11:
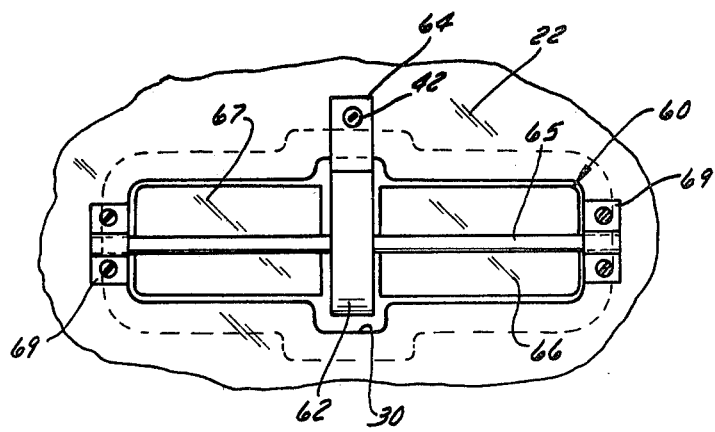
FIG. 11 is a view similar to FIG. 3 but showing still another embodiment.
Figure 12:
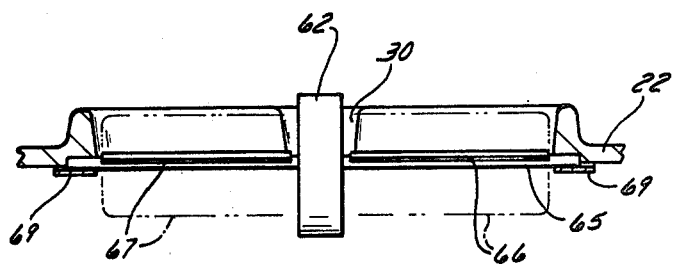
FIG. 12 is a partial view in vertical section of the barbecue unit illustrating the vent damper of FIG. 11 in an open position in broken lines.
Figure 13:
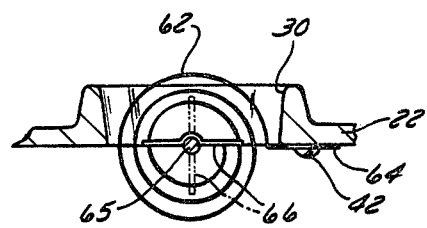
FIG. 13 is an end view of the vent damper shown in FIG. 12.

FIGS. 11–13 depict a still further thermal damper embodiment generally 60. In this embodiment, a bimetallic coil spring member 62 is secured to bottom wall 22 through tab portion 54 and screw 42. A rod 65 extends from spring 62 in opposite directions with vent plates 66 and 67 fastened thereto. Retaining plates 69 afford rotatable positioning of rod 65 in vent opening 30. If desired, spring 62 could be employed with a single vent plate 66 covering a single vent opening.

Figure 15:
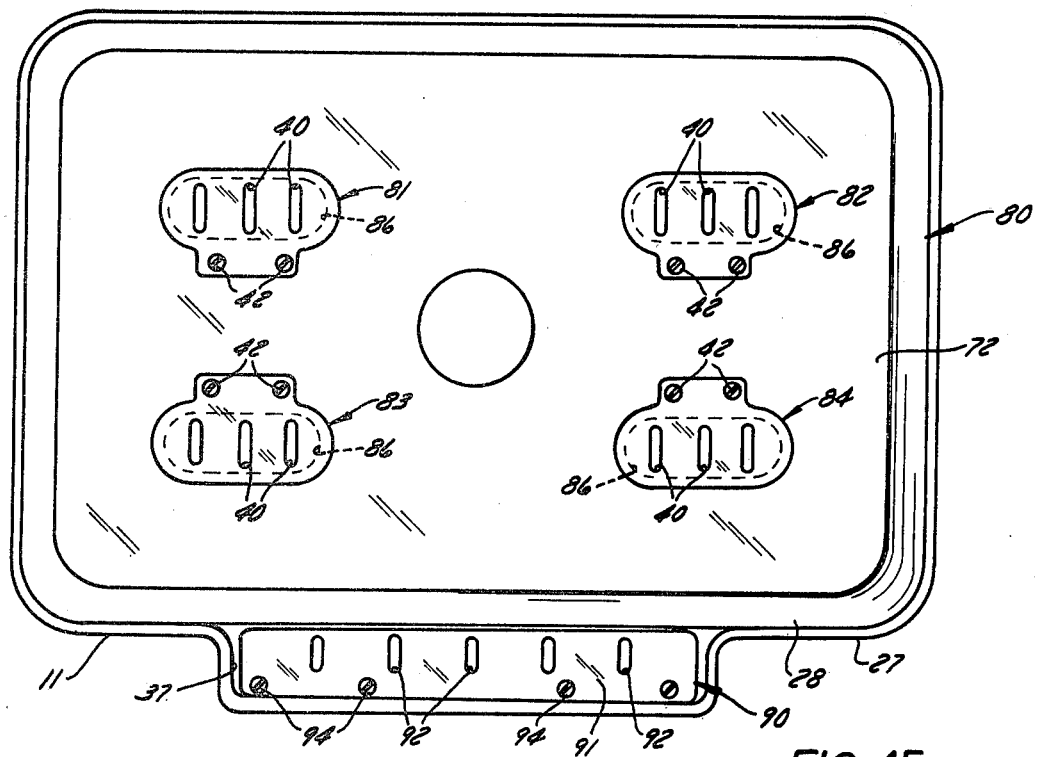
FIG. 15 is a bottom view of a further embodiment showing vent dampers in both the base member and in the cover member.
Figure 16:
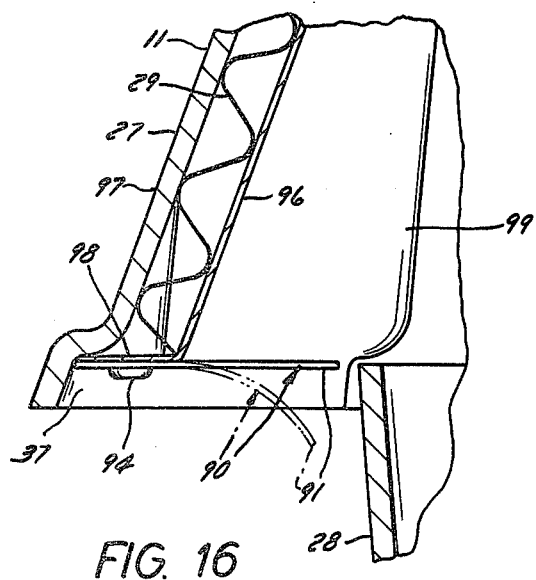
FIG. 16 is a partial view in vertical section showing the vent damper in the cover in an open and a closed position.

FIGS. 15 and 16 depict the thermally efficient barbecue grill unit generally 80 wherein four thermal vent dampers 81–84 are positioned in base member floor 72. They are similar to thermal vent dampers 31–34, 38 and 41 in being composed of a bimetallic plate, having slots 40 and being secured to floor 72 by screws 42. Similarly, vent dampers 81–84 are positioned to cover vent openings 86 as well as to allow air to pass therethrough in the same proportionate manner as for the vent dampers in base member 12. In this embodiment 80, an additional thermally actuated vent damper 90 is positioned in back vent 37 of the back wall 27 of cover member 11. It also has openings 92 in bimetallic plate 91 and is secured by screws 94. As best seen in FIG. 16, the securement is effected by fastening vent damper 90 to transverse portion 98 of inner wall 96. As in both embodiments 10 and 80, cover 11 has an insulation 29 placed between inner and outer walls 96 and 97, respectively.

OPERATION

Figure 3:
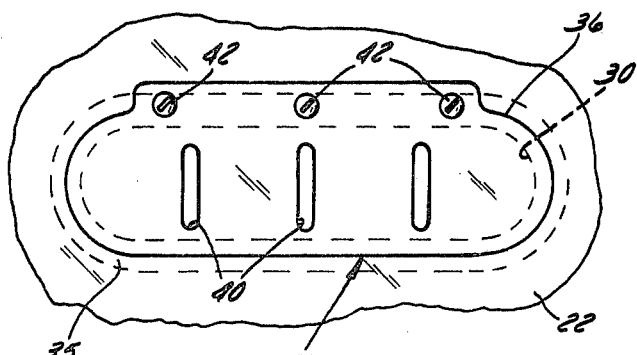
FIG. 3 is a partial bottom view illustrating one of the thermally actuated vent damper units in the barbecue grill unit of FIG. 1.
Figure 4:
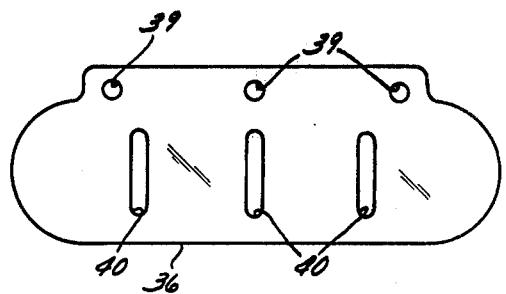
FIG. 4 is a plan view of the vent damper plate shown in FIG. 3.
Figure 5:
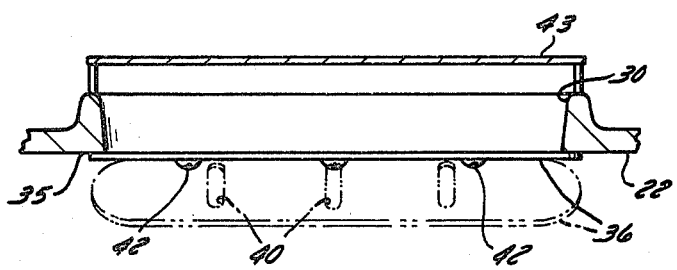
FIG. 5 is a partial view in vertical section of the barbecue unit illustrating the vent damper in an open position in broken lines and in a closed position in solid lines.
Figure 6:
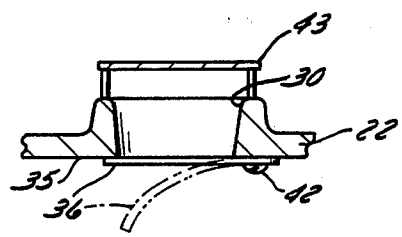
FIG. 6 is an end view of FIG. 5.
Figure 7:
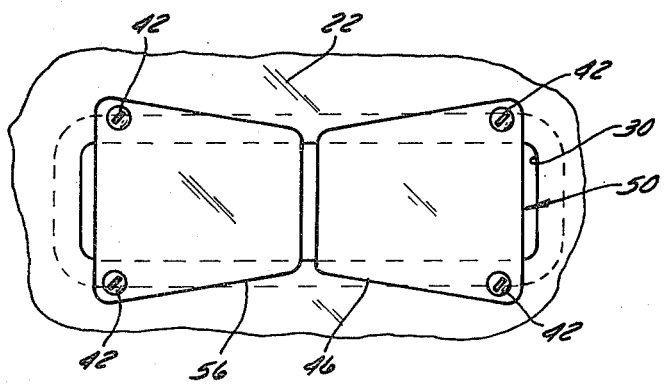
FIG. 7 is a view similar to FIG. 3 but showing an alternative embodiment of the thermally actuated vent damper.
Figure 8:
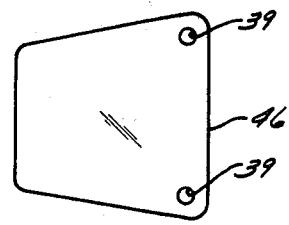
FIGS. 8, 9 and 10 are similar to the view of FIGS. 4, 5 and 6 but of the vent damper in FIG. 7.
Figure 9:
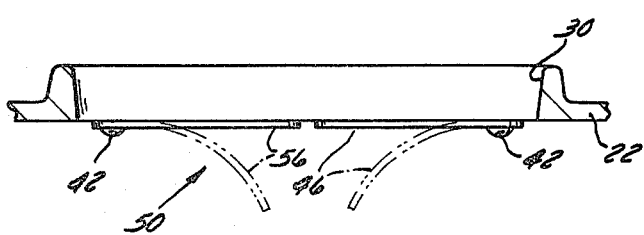
Figure 10:
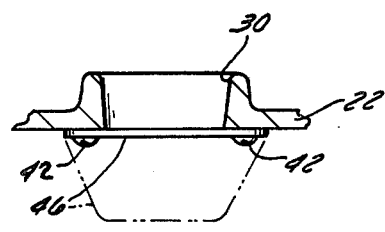

A better understanding of the advantages of grill unit 10 with the previously described thermally actuated dampers will be had by a description of their operation. As all of the dampers operate on basically the same principle, only thermal vent damper 31 will be specifically described. Any substantial differences in operation with respect to vent dampers 50 and 60 will be referred to later. The grill unit 10 will be in condition as shown in FIGS. 1 and 2 but with vent plate 36 basically in a flat condition as indicated in FIGS. 3, 5 and 6 in solid lines. As shown in FIG. 5, when gas is ignited as it emanates from burner 14, the air surrounding the burner will increase in temperature as will portions of base member 12 adjacent damper 31. As the temperature increases, vent plates 36 will begin to bend away from the outside wall surface 33 and vent opening 30. This is indicated by the broken line showings in FIGS. 1, 2, 5 and 6. It will be appreciated that as the vent plates 36 bend outwardly, they expose an increasingly larger vent passageway with the outside atmosphere. This permits increasingly more oxygen to come into contact with the gas from burner 14 which is required for combustion. Of course, if the amount of gas to burner 14 is decreased, the vent plates 36 will begin to bend back in the opposite direction thus incrementally limiting the amount of air to burner 14. Turning off the gas to burner 14 will cause vent plates 36 to return to their original position which is flat against the outside wall surface 35 of base 12.

The operation of vent dampers 50 and 60 are substantially the same as described for vent damper 31 in proportionately providing sufficient outside air for combustion without permitting excess outside cold air to enter. The advantage of damper 50 in having two plates 46 and 56 is reduced material cost, while an advantage of spring damper unit 60 is quicker response and smoother operation due to location of thermal spring 62 in relationship to heat source 14 and pivoting of air shutter plates 66 and 67 with rod 65.

Another important aspect is the venting of cover 11 with vent 37 therein positioned in the back wall 27 and adjacent the top edge of back wall 28 of base 12. This assures proper circulation of the heated air before it is ventilated to outside atmosphere. As indicated in embodiment 80, a bimetallic damper 90 is positioned in cover vent 37 to control air flow. This damper 90 could be used with or without intake dampers 81–84. The advantage of having damper 90 is better location for damper operation and heat retention. If desired, any number of thermally actuated vent damper means can be employed in the cover and base member. The important consideration is that they are spaced apart a sufficient distance to provide maximum air distribution. In the instance where damper 90 is not employed, at least two dampers such as 31–34 or 81–84 should be employed in the base member. It should also be recognized that vent dampers such as 31, 50, 60, 81 or 90 could be interchanged.

An important feature in conjunction with thermally actuated damper units 31–34, 38, 41, 50, 60, 81–84 and 90 is the fact that all of the walls of the cover 11 and base 12 are insulated. This aids in containing heat within the grill unit 10.

The preferred material for forming cover 11 and base 12 is cast aluminum. Vent damper plates 36, 46, 56, 91 as well as spring 62 are fabricated from a laminated bimetallic material. They are available from Texas Instruments and are sold as thermostat metals. The plate members are also available from American Metal Products Co., a division of Masco Corp., Los Angeles, Ca.

While a baffle member 43 is utilized in conjunction with vent openings 30 and the associated vent plate, it can be eliminated without substantially affecting the performance of the grill unit. Although the thermally actuated vent dampers 31–34, 38, 41, 50, 60, 81–84 and 90 are illustrated for use with a gas burner such as 14, they are also effective with grills burning other fuels such as charcoal or wood.

It will thus be seen that through the present invention there is provided a fuel efficient barbecue grill unit which permits only sufficient outside cool air to enter for purposes of combustion. Thermally actuated dampers are afforded in combination with insulated walls of the grill unit and a specific venting in the cover. This affords a cool surface to touch and thus reduces burns. The thermally actuated dampers also permit the burner 14 to operate at low gas flow rates without becoming extinguished from outside wind. All of the above features are made available from existing materials and without the need for special tooling.

The foregoing invention can now be practiced by those skilled in the art. Such skilled persons will know that the invention is not necessarily restricted to the particular embodiments presented herein. The scope of the invention is to be defined by terms of the following claims as given meaning by the preceding description.

I claim:

1. A thermally actuated vent damper apparatus for a barbecue grill comprising:
    a base member constructed and arranged to receive a gas supply conduit and a burner element with noncombustible briquettes positioned between said burner element and a grill member;
    a cover member dimensioned to enclose the top of said base member;
    vent means operatively associated with said base and cover members; and
    a thermally actuated vent means operatively positioned in conjunction with said vent means in said base and cover member so that upon the temperature in said base member increasing, said thermally actuated vent means will proportionately permit more air to enter said base member through said vent means in said base member and upon said temperature in said base member decreasing, said thermally actuated vent means will proportionately limit the amount of air entering said base member.

2. The thermally actuated vent damper apparatus for a barbecue grill as defined in claim 1 wherein said thermally actuated vent means of the laminated bimetallic plate type.

3. The thermally actuated vent damper apparatus for a barbecue grill as defined in claim 2 wherein said bimetallic plate is defined by a single plate having apertures therein.

4. The thermally actuated vent damper apparatus for a barbecue grill as defined in claim 2 wherein said bimetallic plate is defined by two oppositely positioned plate members presenting a closed surface.

5. The thermally actuated vent damper apparatus for a barbecue grill as defined in claim 1 wherein said thermally actuated vent means includes a thermally expanding coil spring and a damper plate.

6. The thermally actuated vent damper apparatus for a barbecue grill as defined in claim 5 wherein two damper plates are operatively and oppositely positioned with respect to said coil spring.

7. The thermally actuated vent damper apparatus for a barbecue grill as defined in claim 1 wherein at least one of said cover and base members are defined by insulated walls.

8. The thermally actuated vent damper apparatus for a barbecue grill as defined in claim 1 wherein at least two of said thermally actuated vent means are disposed in a bottom floor of said base member and spaced apart a sufficient distance to provide maximum air distribution.

9. The thermally actuated vent damper apparatus for a barbecue grill as defined in claim 11 wherein said vent means in said cover is positioned adjacent the top of said base member and the rear wall thereof.

10. A fuel efficient gas barbecue grill apparatus comprising:
    an insulated base member constructed and arranged to receive a gas inside intake conduit and a burner element with a grill member positioned above said burner element and noncombustible briquettes positioned between said burner element and said grill member;
    an insulated cover member dimensioned to enclose the top of said base member;
    vent means operatively associated with said base and cover members; and
    a thermally actuated vent means operatively positioned in conjunction with said vent means in said base and cover member so that upon the temperature in said base member increasing, said thermally actuated vent means will proportionately permit more air to enter said base member through said vent means in said base member and upon said temperature in said base member decreasing, said thermally actuated vent means will proportionately limit the amount of air entering said base member.

11. The fuel efficient gas barbecue grill apparatus as defined in claim 10 wherein said thermally actuated vent means is of the laminated bimetallic plate type.

12. The fuel efficient gas barbecue grill apparatus as defined in claim 11 wherein said bimetallic plate is defined by a single plate having apertures therein.

13. The fuel efficient gas barbecue grill apparatus as defined in claim 11 wherein said bimetallic plate is defined by two oppositely positioned plate members presenting a closed surface.

14. The fuel efficient gas barbecue grill apparatus as defined in claim 10 wherein said thermally actuated vent means includes a thermally expanding coil spring and a damper plate.

15. The fuel efficient gas barbecue grill apparatus as defined in claim 14 wherein two damper plates are operatively and oppositely positioned with respect to said coil spring.

* * * * *

UNITED STATES PATENT AND TRADEMARK OFFICE
CERTIFICATE OF CORRECTION

PATENT NO. : 4,434,781
DATED : March 6, 1984
INVENTOR(S) : Walter Koziol

It is certified that error appears in the above—identified patent and that said Letters Patent is hereby corrected as shown below:

Column 2, line 66 should read:

holes 39 and screws 42. Slots 40 are provided in the

Column 3, line 15 should read:

through tab portion 64 and screw 42. A rod 65 extends

Column 3, line 57 should read:

wall surface 35 and vent opening 30. This is indicated

Column 5, line 27, Claim 2 should read:

mally actuated vent means is of the laminated bimetallic

Column 6, line 6, Claim 9 should read:

a barbecue grill as defined in claim 8 wherein said vent

Signed and Sealed this

Twelfth Day of June 1984

[SEAL]

Attest:

GERALD J. MOSSINGHOFF

Attesting Officer

Commissioner of Patents and Trademarks